UNITED STATES PATENT OFFICE.

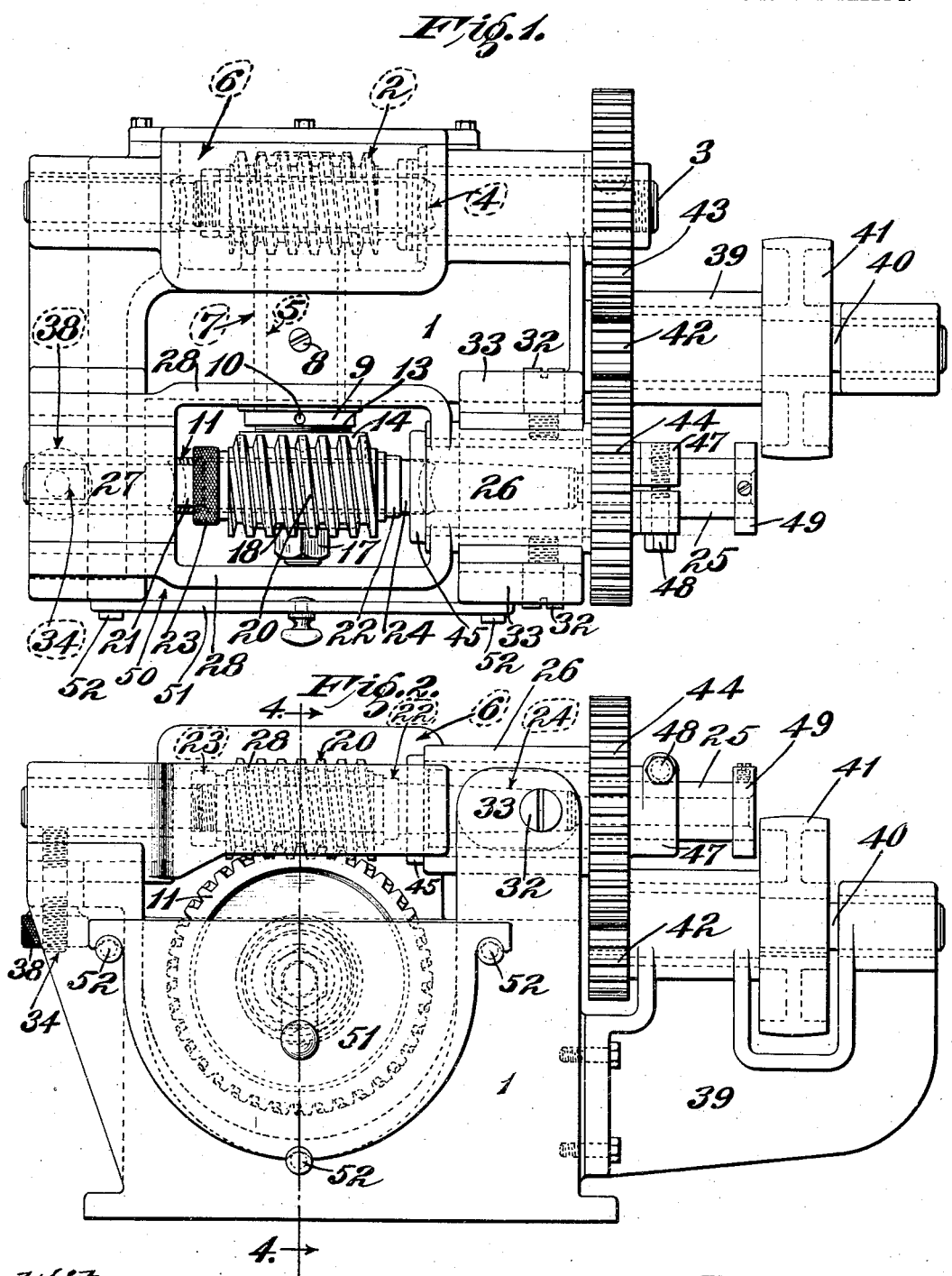

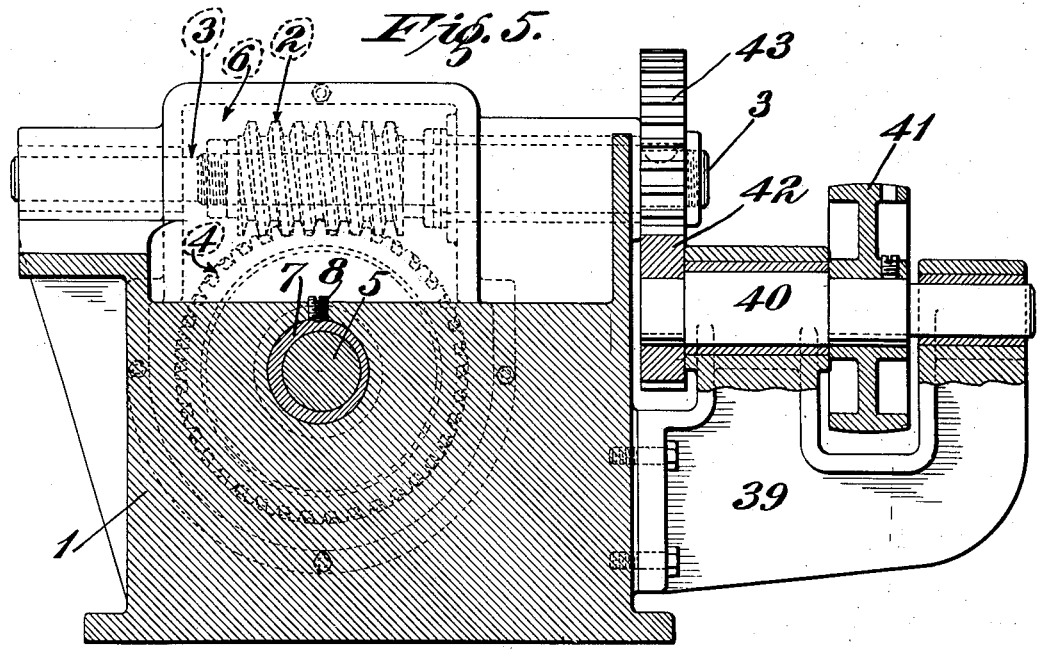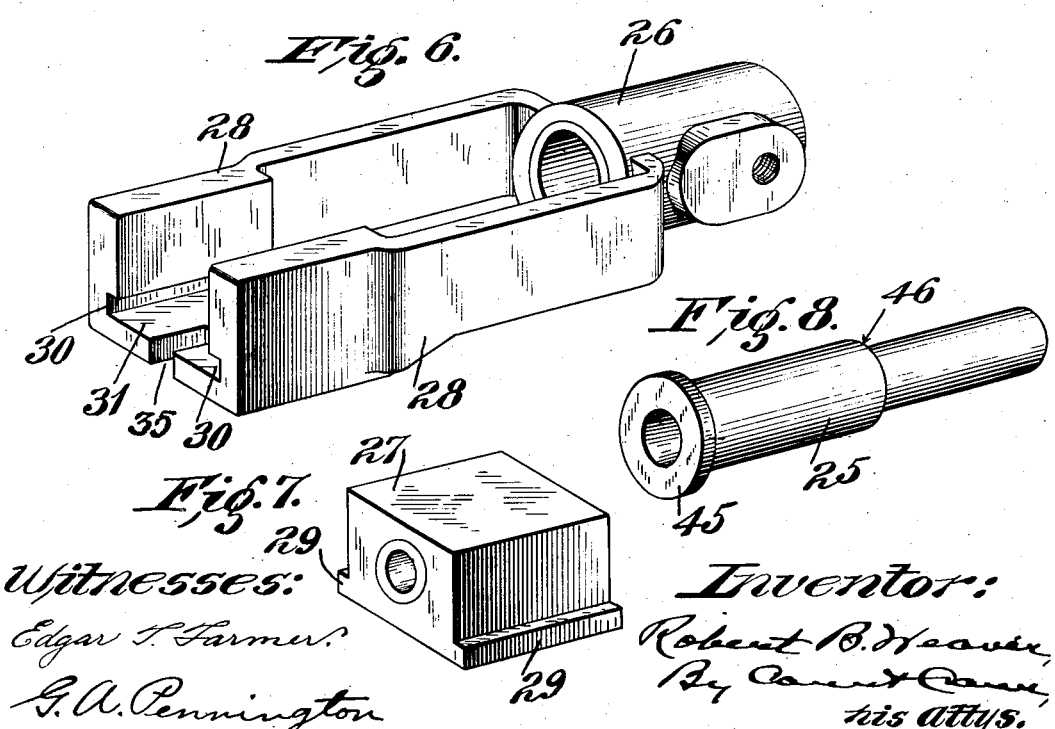

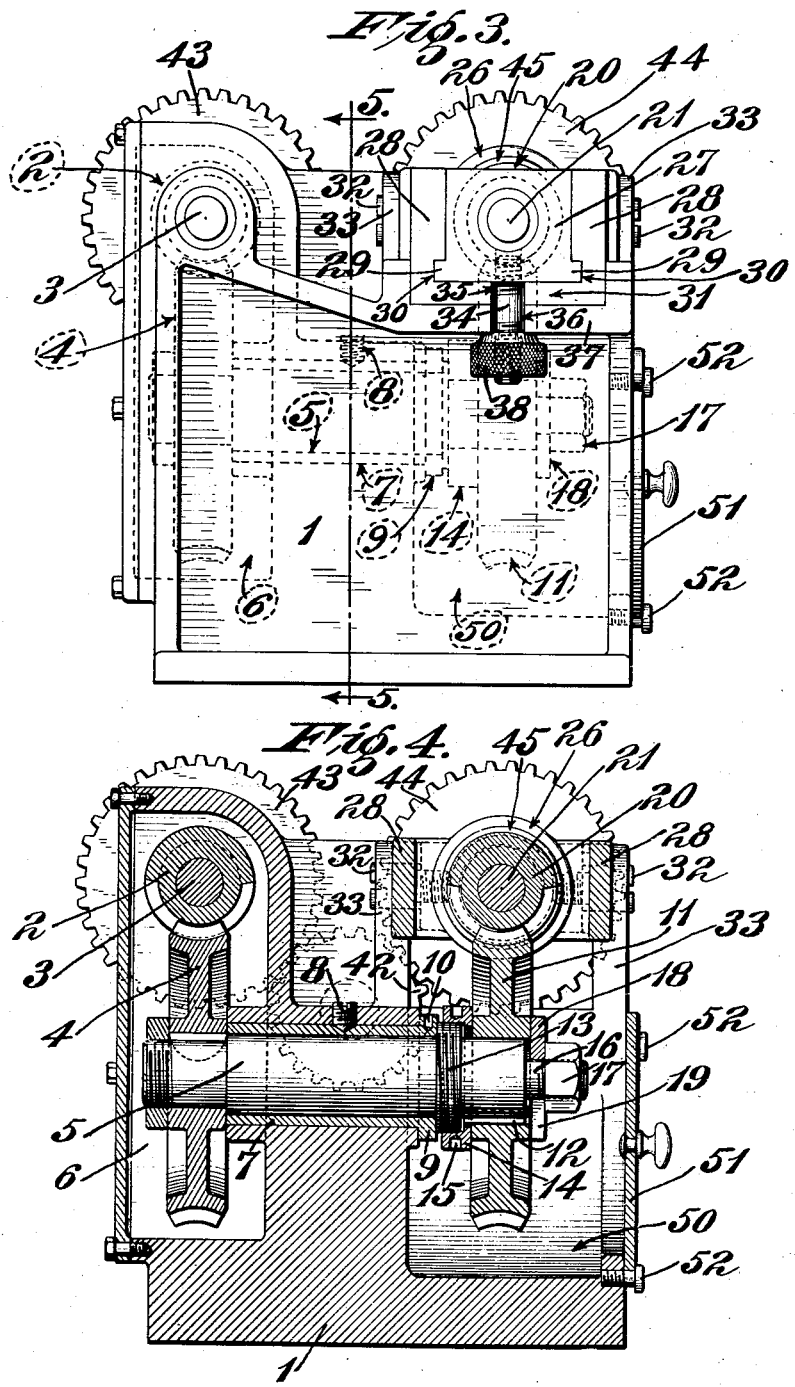

ROBERT B. WEAVER, OF DETROIT, MICHIGAN, ASSIGNOR TO THE TIMKEN-DETROIT AXLE COMPANY, OF DETROIT, MICHIGAN, A CORPORATION OF OHIO.

GEAR-GRINDING DEVICE.

1,032,974.   Specification of Letters Patent.   Patented July 16, 1912.

Application filed February 6, 1912. Serial No. 675,824.

*To all whom it may concern:*

Be it known that I, ROBERT B. WEAVER, a citizen of the United States, and a resident of the city of Detroit, in the county of Wayne and State of Michigan, have invented a new and useful Improvement in Gear-Grinding Devices, of which the following is a specification.

This invention relates to devices for grinding and finishing gears and more particularly those constituting worm or screw gearing and spiral gears and the like.

It has for its principal objects to produce a machine by the use of which the high spots on the teeth and rubbing surfaces of intermeshing gears may be eliminated without materially affecting the low spots.

The invention consists in the parts and in the arrangements and combinations of parts hereinafter described and claimed.

In the accompanying drawings which form part of this specification and wherein like symbols refer to like parts wherever they occur,—Figure 1 is a top plan view of a machine illustrating an adaptation of the invention; Fig. 2 is a side elevation; Fig. 3 is an end elevation; Fig. 4 is a section taken on the line 4—4 of Fig. 2; Fig. 5 is a section taken on the line 5—5 of Fig. 3; Fig. 6 is a perspective view of the cradle which carries the worm to be ground; Fig. 7 is a perspective view of the removable bearing block; and Fig. 8 is a perspective view of the stub-shaft.

The machine illustrated in the drawings comprises a body casting or base 1. A master worm or screw-gear 2 is fastened on a shaft 3 and meshed with a worm-wheel 4 fixed on a shaft 5. This gearing is housed in a closed chamber 6 so that dust is excluded and the gears may be run in oil if desirable. The shaft 5 rotates in an eccentric bore in a bushing 7 rotatably fitted in the body casting 1 and locked in place by a set-screw 8. By turning the bushing 7 the gears 2 and 4 are adjusted in mesh so that all back lash is taken up, which is necessary as will hereinafter more fully appear. To facilitate such adjustment the bushing is provided at its end with a collar portion 9 having a peripheral recess or recesses 10 for the application of wrench.

The worm-wheel 11 to be ground is an exact duplicate of the master worm-wheel.
That is, in so far as the tooth arrangement is concerned. The shaft 5 is arranged so that the worm-wheel 11 can be readily attached and detached. It is obviously provided with a spline or key 12; a screw-threaded collar or annular enlargement 13 on which is fitted a clamping and adjusting ring 14 having a peripheral recess or recesses 15 for the application of a wrench; and its end portion is reduced, as at 16, and screw-threaded to receive a securing nut 17. A washer 18 is interposed between the nut and the worm-wheel and it is slotted, as at 19, so that it may be removed without removing the nut entirely from the shaft; the nut being small enough to allow the worm-wheel to slip over it.

The worm or screw 20 to be ground is removably attached on a spindle 21, for which purpose the latter is provided with a fixed collar 22 and an opposed removable screw-threaded collar or clamping ring 23. The spindle is provided at one end with a taper shank 24 fitted tight in a counterpart axial socket in a stub-shaft 25 journaled in a cradle or pivoted open frame 26. The opposite end portion of the spindle is reduced in diameter and journaled in a bearing block 27 fitted slidably between the end portions of the side members 28 of the cradle. This block is provided with ribs 29 which slide in undercut grooves 30 provided in the inner faces of said members 28; and it rests on the connecting web 31.

The cradle 26 is provided with trunnions 32 which are respectively journaled in parallel members 33 projecting up from the base 1, so that the cradle may be swung up to disengage the worm 20 from the gear 11. It is held normally against such upward movement by a stud 34 secured to the block 27 and projecting down through a slot 35 in the web 31 of the cradle and a registering slot 36 provided in a flange or shelf 37 on the base 1, and having its lower end portion screw-threaded to receive a screw 38 which bears against the under side of said flange 37.

Journaled in a bracket extension 39 on the base 1 is a shaft 40 having a driving pulley 41 fixed thereon. This shaft has a pinion 42 fixed on it meshing with a gear 43 fixed on the shaft 3 and a like gear 44 on the stub-shaft 25, the teeth of said pinion and gears being accurately formed and meshed so as to run without any back lash.

The inner end of the stub-shaft 25, as more clearly shown in Fig. 8, is provided with a thrust collar 45 and its projecting outer end portion is reduced in diameter to provide a shoulder 46 against which the gear 44 abuts. The gear 44 thus serves as a thrust member opposed to the collar 45. The gear 44 is provided with a split hub portion 47 and locking-screw 48, so that it may be releasably clamped on the stub-shaft 25 in order to be slid out of mesh with the pinion 42 to raise the cradle 26 high enough to facilitate the placing or removal of the spindle 21 and worm 20 carried thereon. A collar 49 is provided to serve as a stop to hold the gear 44 on the stub-shaft while the cradle is tilted.

When the shaft 40 is rotated the pinion 42 actuates the gears 43 and 44 in one direction and at the same speed, and consequently the shaft 3 and spindle 21 are rotated simultaneously at a like speed and, of course, the master worm 2 and worm 20 to be ground are thereby positively driven at the same velocity. The worm-wheel 4 being in snug mesh with the worm 2 is driven without any back lash, and the worm-wheel 11 to be ground being fixed on the shaft 5 rotates positively with said worm-wheel 4. Therefore, the worm 20 and worm-wheel 11 are revolved by means external of themselves at a continuously correct velocity ratio irrespective of any high or low spots on their coöperating rubbing faces. By sprinkling or otherwise applying emery or other abrasive material on the gears to be ground, while they are being thus rotated, the touching high spots are gradually worn down without affecting the low spots. At the beginning, the cradle is lowered until the worm 20 is brought into mesh with the worm-wheel 11 so that the highest spots touch, and after the worm has run in this position for a while it is adjusted into closer mesh until other high spots touch, and so on until a uniform and smooth bearing is had all over the rubbing faces. The adjustment is effected by manipulating the screw 38 which works on the stud 34. Obviously, therefore, this uniform bearing will then represent an absolutely invariable and correct velocity ratio between the worm and worm-wheel which have thus been ground.

Instead of sprinkling or flowing the abrasive material onto the gears, the material may be filled into the chamber 50 in which the worm-wheel 11 runs, to be taken up by the teeth of the worm wheel. This chamber is provided with a removable side plate or door 51 having marginal notches to fit upon headed studs 52 projecting from the side of base 1.

Obviously, a machine of the same arrangement as that illustrated may be used for grinding and finishing spiral gears or similar gearing whose elements have their axes disposed at right angles. So, too, the machine admits of considerable modification without departing from the invention. Therefore, I do not wish to be limited to the specific construction and arrangement shown.

What I claim is:

1. In a machine of the class described, means for holding mated gears to be ground in correct working relation, a set of master gears in duplication of the gears to be ground, said master gears meshing free of back lash, means for positively driving the master driving gear and the driving gear to be ground simultaneously and at the same velocity, and means actuated by the master driven gear for positively driving the driven gear to be ground simultaneously and at the same velocity with said master driven gear.

2. In a machine of the class described, means for holding mated gears to be ground in correct working relation, a set of master gears in duplication of the gears to be ground, said master gears meshing free of back lash, means for positively driving the master driving gear and the driving gear to be ground simultaneously and at the same velocity, means actuated by the master driven gear for driving the driven gear to be ground simultaneously and at the same velocity with said master driven gear, and means for moving said gears to be ground into closer mesh.

3. In a machine for grinding gears of the character described, a pair of rotary gear carriers, means for positively rotating said gear carriers at the same velocity, a master driving gear fixed on one of said carriers, said other carrier being adapted to receive a duplicate of the driving gear to be ground, a third rotatory gear carrier, a master driven gear fixed on said third carrier in mesh with said master driving gear free of back lash, said third gear carrier being adapted to receive a duplicate of the driven gear to be ground so as to mesh with said driving gear to be ground.

4. In a machine for grinding gears of the character described, a pair of rotatory gear carriers, means for positively rotating said gear carriers at the same velocity, a master driving gears fixed on one of said carriers, said other carrier being adapted to receive a duplicate of the driving gear to be ground, a third rotatory gear carrier, a master driven gear fixed on said third carrier in mesh with said master driving gear free of back lash, said third gear carrier being adapted to receive a duplicate of the driven gear to be ground so as to mesh with said driving gear to be ground, and means for moving the gears to be ground gradually into closer mesh.

5. A machine for grinding worm gearing, comprising a master worm and worm-wheel meshed to run without back lash, means for holding a worm and worm-wheel to be ground in correct working position in parallel relation to said master gearing, external means for positively driving the master worm and worm to be ground simultaneously and at the same velocity, and a fixed connection between the master worm-wheel and worm-wheel to be ground whereby they are rotated simultaneously and at the same velocity.

6. A machine for grinding gears of the character described, comprising means for holding a set of gears to be ground in correct working relation, a set of accurately formed master gears in duplication of the gears to be ground, external means for driving the driving gears of both sets simultaneously and at the same velocity, and means operated by the master driven gear for positively driving the driven gear to be ground simultaneously and at the same velocity.

7. In a machine of the character described, a pair of parallel rotatory gear carriers, a set of gears for rotating said carriers without back lash and at the same velocity, a third gear carrier whose axis is disposed at right angles to the axes of said first mentioned gear carriers, a master driving gear on one of said first mentioned gear carriers, a master driven gear on said second mentioned gear carrier, said gears being meshed so as to run without back lash, a driving gear on the other of said first mentioned gear carriers to be ground, a driven gear on said second mentioned gear carrier to be ground in mesh with the driving gear to be ground, and means for maintaining an abrasive material in contact with the coöperating faces of said gears to be ground.

8. In a machine of the character described, a rotatory shaft having a master driving gear thereon, a shaft disposed at right angles to said first mentioned shaft and having a master driven gear thereon meshing with said master driving gear so as to run without back lash, a driven gear to be ground on said second mentioned shaft, a shaft adjustably mounted in parallel relation to said first mentioned shaft, a driving gear to be ground on said adjustably mounted shaft, and means for positively rotating said first mentioned shaft and said adjustably mounted shaft simultaneously and at the same velocity.

9. In a machine of the character described, a rotatory shaft, a master gear thereon, a shaft disposed at an angle to said first mentioned shaft, a master gear on said second mentioned shaft in mesh with said first mentioned master gear so as to run without back lash, said second mentioned shaft being adapted to receive a gear to be ground, a hinged frame, a rotatory gear holder journaled in said frame and adapted to receive a gear to be ground in mesh with said first mentioned gear to be ground, means for moving said frame to bring the gears to be ground into closer mesh, and means for positively rotating said first mentioned shaft and said gear holder simultaneously and at the same velocity.

10. In a machine for grinding worm gears, means for holding the worm and worm-wheel to be ground in correct working relation, and means external of said worm and worm-wheel for driving them independently but simultaneously and at their correct velocity ratio.

11. In a machine for grinding worm gears, means for holding the worm and worm-wheel to be ground in correct working relation, means external of said worm and worm-wheel for driving them independently but simultaneously and at their correct velocity ratio, and means for maintaining an abrasive material in contact with the working faces of said worm and worm-wheel.

12. A machine for grinding worm gears, comprising a rotatory shaft, a master worm thereon, an adjustably mounted rotatory shaft extending at right angles to the axis of said first mentioned shaft, a master worm-wheel on said adjustably mounted shaft in mesh with said master worm, said adjustably mounted shaft being adapted to receive a worm-wheel to be ground, an adjustably supported rotatory carrier adapted to receive a worm to be ground in mesh with said worm-wheel to be ground, duplicate driving gears on said first mentioned shaft and the carrier for the worm to be ground, and a driving pinion meshing with said duplicate driving gears so as to actuate them without back lash.

Signed at Detroit, Michigan, this 1st day of February, 1912.

ROBERT B. WEAVER.

Witnesses:
H. W. ALDEN,
LESLIE WILLIAMS.